United States Patent [19]
Nakamura

[11] Patent Number: 5,184,527
[45] Date of Patent: Feb. 9, 1993

[54] ENGINE CONTROL SYSTEM FOR AN AUTOMOTIVE POWER TRAIN INCLUDING A TORQUE CONVERTER

[75] Inventor: Hideo Nakamura, Yokosuka, Japan

[73] Assignee: Nissan Motor Co., Ltd., Yokohama, Japan

[21] Appl. No.: 710,177

[22] Filed: Jun. 6, 1991

[30] Foreign Application Priority Data
Jun. 6, 1990 [JP] Japan .................. 2-146088

[51] Int. Cl.$^5$ .................. B60K 17/34
[52] U.S. Cl. .................. 74/866; 364/424.1
[58] Field of Search .................. 74/866; 364/424.1

[56] References Cited
U.S. PATENT DOCUMENTS

| | | | |
|---|---|---|---|
| 4,107,776 | 8/1978 | Beale | 74/866 X |
| 4,765,434 | 8/1988 | Kawamoto et al. | 74/866 X |
| 4,788,892 | 12/1988 | Konoda et al. | 74/866 OR |
| 4,825,368 | 4/1989 | Itoh et al. | 74/866 X |
| 4,953,654 | 9/1990 | Imaseki et al. | 74/866 X |
| 4,982,809 | 1/1991 | Nakamura et al. | 74/866 X |

Primary Examiner—Leslie A. Braun
Assistant Examiner—Daniel Wittels
Attorney, Agent, or Firm—Lowe, Price, LeBlanc & Becker

[57] ABSTRACT

In order to compensate for the effect of a torque converter on the transmission of engine torque to the driving wheels, target engine speed and torque values are derived and used in combination with vehicle drive shaft torque and a target vehicle drive shaft torque value to enable model matching which permits engine parameters to be accurately adjusted. The control being exercised can be modified in accordance with steering angle, sensed rain fall, road inclination and the like.

12 Claims, 8 Drawing Sheets

FIG.3
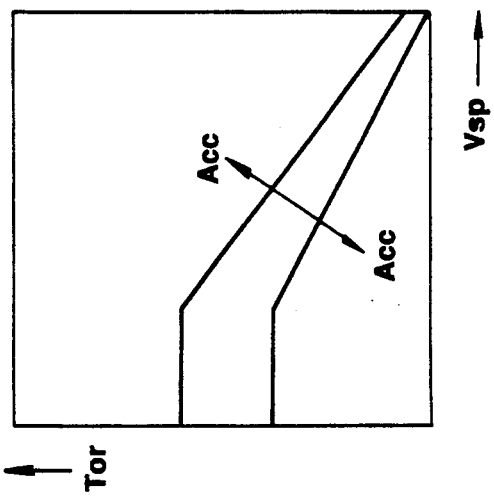
TABLE 3
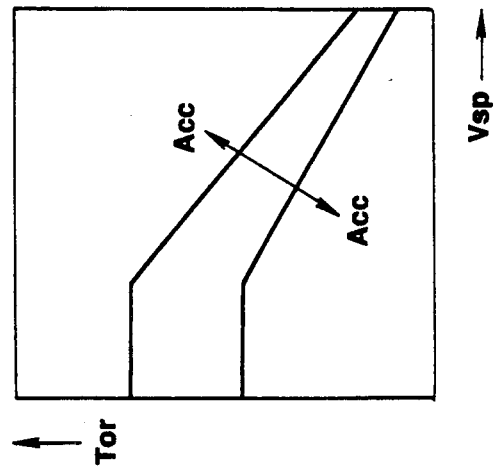
TABLE 2
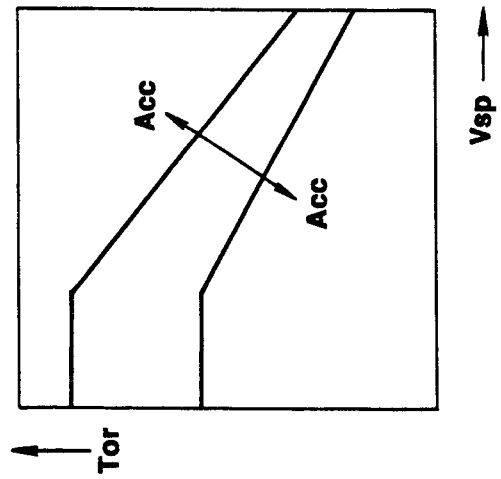
TABLE 1
STEERING ANGLE α

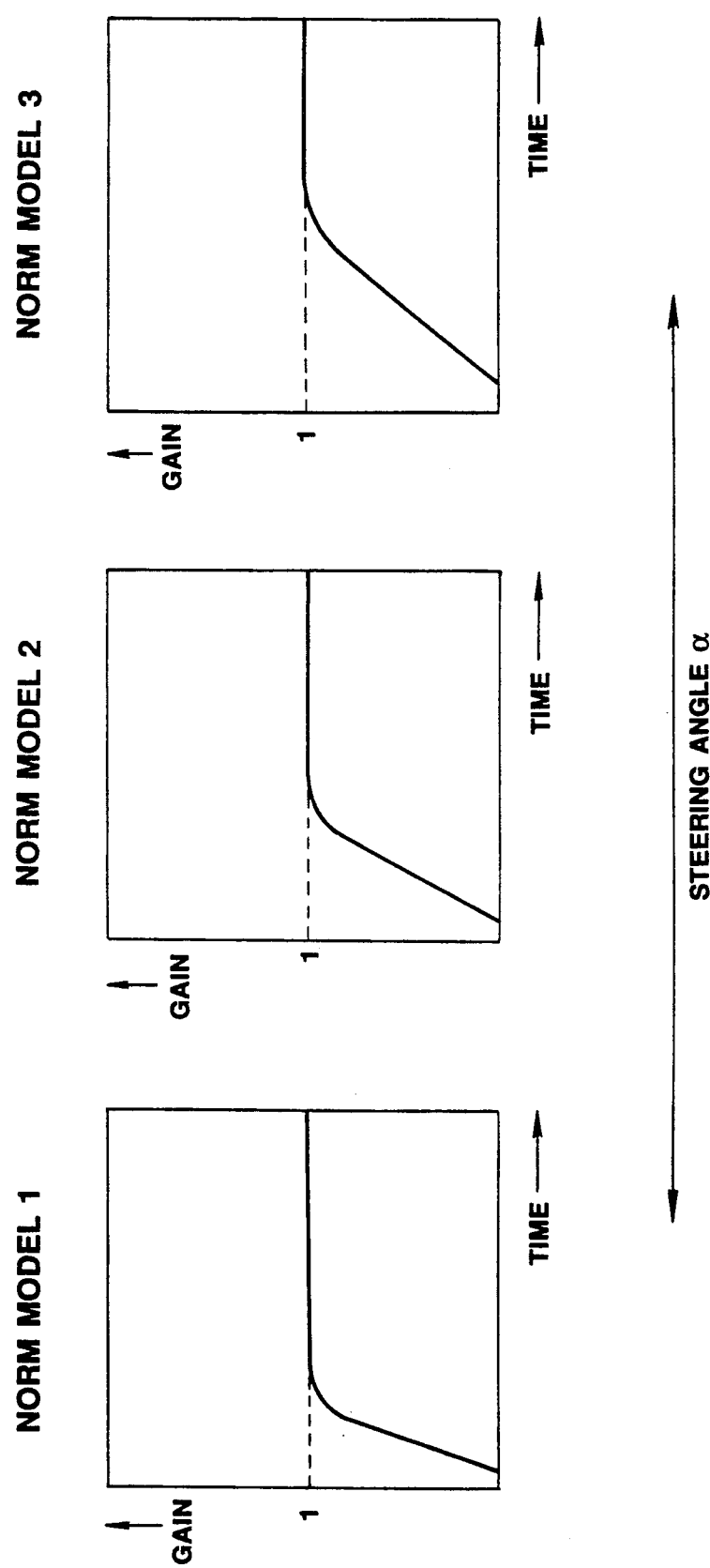

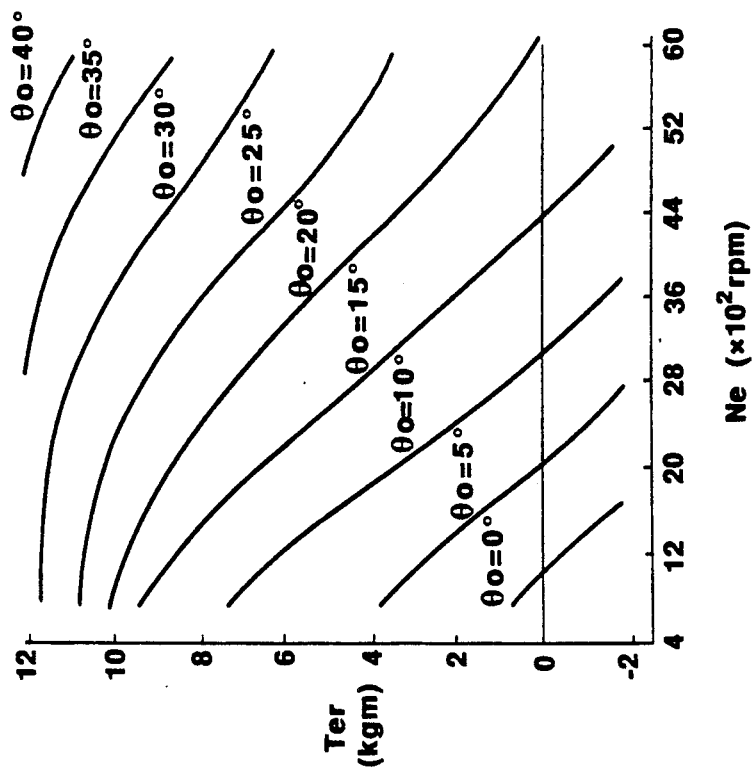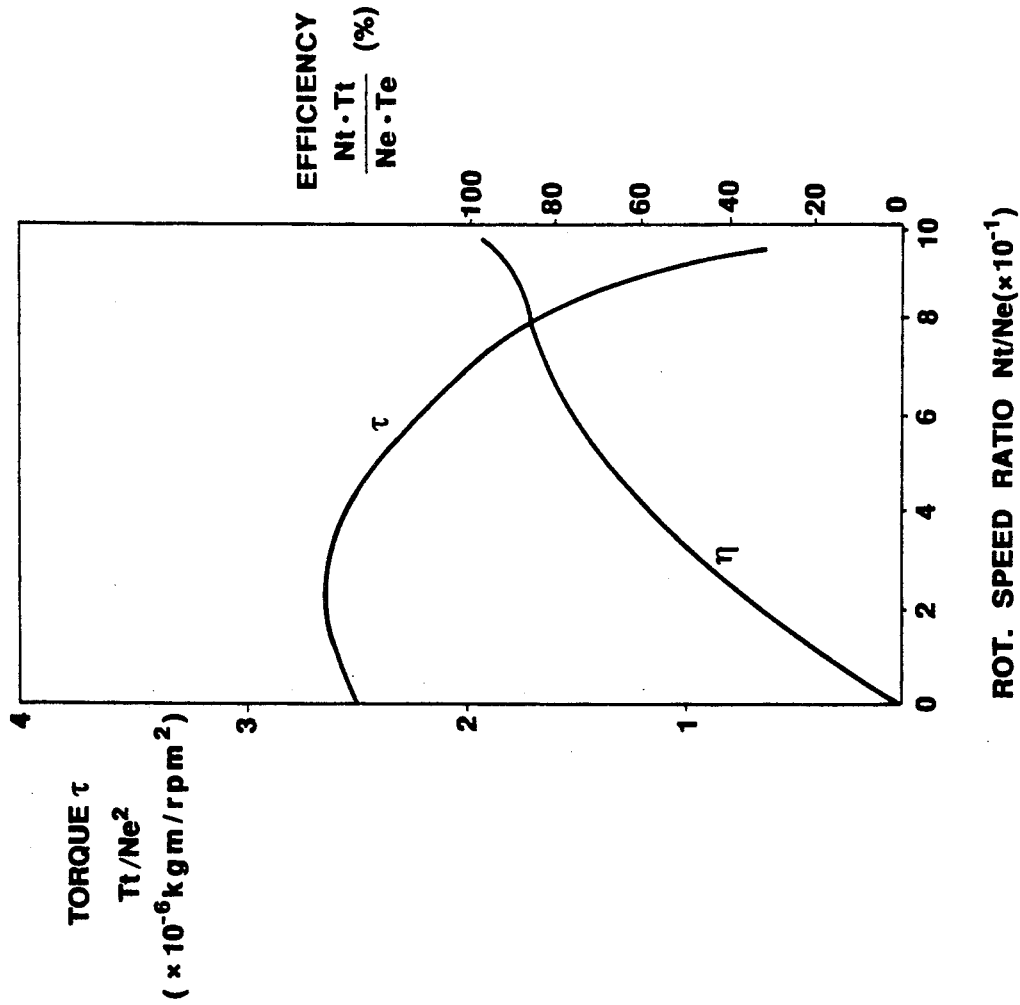

FIG.8
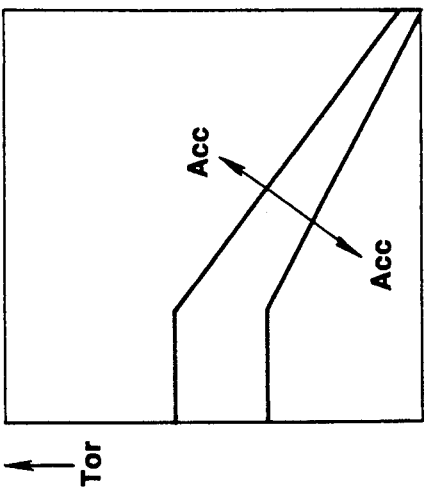
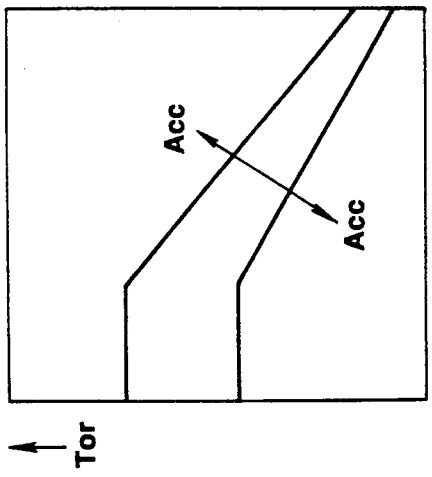
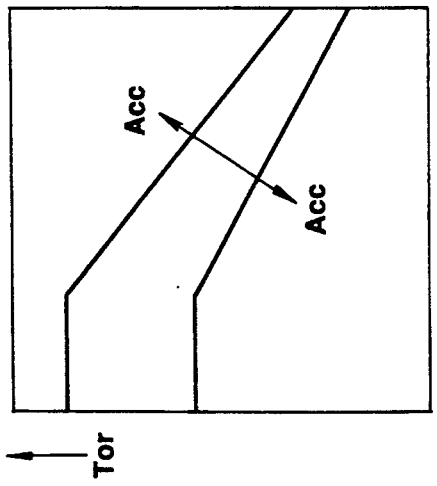

FIG. 9
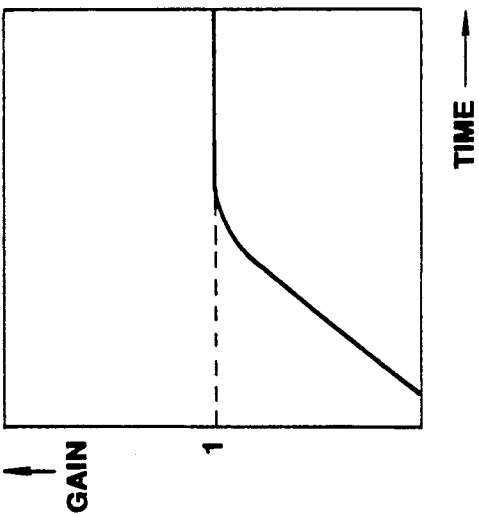
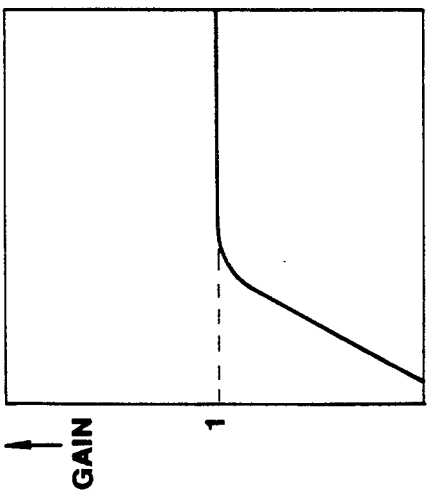
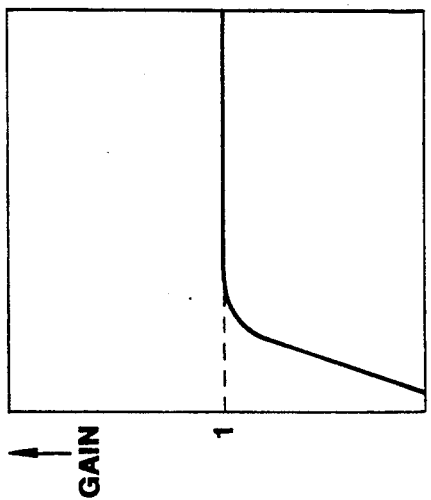
RAIN FALL R →
ROAD INCLINATION →
DRIVE WHEEL LOAD N ←

ENGINE CONTROL SYSTEM FOR AN AUTOMOTIVE POWER TRAIN INCLUDING A TORQUE CONVERTER

BACKGROUND OF THE INVENTION

1. Field of the Invention

The present invention relates generally to an engine control system for an automotive power train and more specifically to an control system for an automotive power train which includes a torque converter.

2. Description of the Prior Art

JP-A-1-313636 discloses an engine control system to overcome the difficulty in controlling the amount of fuel supplied to the engine during transient modes of operation, the basic engine output shaft torque control utilizes the fuel injection amount and the amount of air being inducted. However, this technique sets a target engine torque output based on the amount of accelerator pedal movement.

In the event that a torque converter is used to provide a drive connection between the engine and a transmission associated with the engine, the amount of torque which is supplied to the vehicle drive shaft or shafts, is not commensurate with the amount of accelerator pedal movement.

By way of example, when a vehicle is moving off from standstill, the accelerator pedal may be deeply depressed and induce a marked increase in engine rotational speed and torque generation. However, under these conditions vehicle acceleration does not increase proportionally. The reason for this is that, by the very nature of the torque converter, the ratio of the torque converter input and output shafts does not assume a 1:1 relationship.

Further, as the characteristic relationship between accelerator pedal movement and drive shaft torque varies with the type of engine, torque converter construction and mode of driving, it is not possible to develop an optimal control relationship.

For example, during cornering, sudden increases in torque is apt to induce vehicle spin, while in the case the vehicle is running in a straight line, such an increase is apt not to produce any problems. Thus, it is left to the driver's discretion to determine the instant driving conditions and to determined when and how much the accelerator pedal movement should be induced.

SUMMARY OF THE INVENTION

It is an object of the present invention to provide a control system which takes the effect and characteristics of the torque converter into consideration and appropriately controls the amount of torque which is produced by the engine.

In brief, the above object is achieved by an arrangement in which, in order to compensate for the effect of a torque converter on the transmission of engine torque to the driving wheels, target engine speed and torque values are derived and used in combination with vehicle drive shaft torque and a target vehicle drive shaft torque value to enable model matching which permits engine control control parameters to be accurately adjusted. The control can be modified in accordance with steering angle, sensed rain fall, road inclination and the like.

More specifically, a first aspect of the invention provides a vehicle having an engine and a transmission which is operatively connected to the engine by way of a torque converter, and an engine control system which features: means for sensing accelerator pedal depression; means for sensing the rotational speed of an output shaft of the torque converter which operatively connects the engine to the transmission; means for sensing the gear ratio which the transmission is conditioned to produce; means for sensing the torque being transmitted by a vehicle drive shaft which is operatively connected to the transmission; means responsive to the accelerator depression sensing means for determining a target vehicle drive shaft torque; means responsive to the engine control amount and a drive train model which includes the engine and the transmission, for determining a vehicle drive shaft toque norm; means for determining the deviation between the output of the vehicle drive shaft torque sensing means and the vehicle drive shaft torque norm; means for correcting a target vehicle drive shaft torque value based on the deviation between the output of the vehicle drive shaft torque sensing means and the vehicle drive shaft torque norm; and model matching means which is responsive to the corrected target vehicle drive shaft torque value, the gear ratio which the transmission is conditioned to produce and the rotational speed of the torque converter output shaft, for determining the engine control amount which is required to bring the amount of torque which is being transmitted by the vehicle drive shaft and a target torque value which is derived using a norm model which is selected on the basis of predetermined vehicular operational parameters, into agreement.

A second aspect of the invention provides a vehicle having an engine and a transmission which is operatively connected to the engine by way of a torque converter, and an engine control system which features: means for sensing accelerator pedal depression; means for sensing the rotational speed of an output shaft of the torque converter which operatively connects the engine to the transmission; means for sensing the gear ratio which the transmission is conditioned to produce; means for sensing the torque being transmitted by a vehicle drive shaft which is operatively connected to the transmission; means responsive to the accelerator depression sensing means for determining a target vehicle drive shaft torque; means for deriving a vehicle drive shaft torque norm based on a corrected target vehicle drive shaft torque and a delay which is endowed by selected norm model; means for determining the deviation between the output of the vehicle drive shaft torque sensing means and the vehicle drive shaft torque norm; means for correcting a target vehicle drive shaft torque value based on the deviation between the output of the vehicle drive shaft torque sensing means and the vehicle drive shaft torque norm; model matching means which is responsive to the corrected target vehicle drive shaft torque value, the gear ratio which the transmission is conditioned to produce, and the rotational speed of the torque converter output shaft, for determining an engine control amount which is required to bring the amount of torque which is being transmitted by the vehicle drive shaft and a target torque value which is derived using the norm model which is selected on the basis of predetermined vehicular operational parameters, into agreement.

A further aspect of the invention provides a method of operating the engine of a vehicle having a transmission which is operatively connected to the engine by way of a torque converter, the method featuring the steps of: sensing accelerator pedal depression; sensing the rotational speed of an output shaft of the torque converter which operatively connects the engine to the transmission; sensing the gear ratio which the transmission is conditioned to produce; sensing the torque being transmitted by a vehicle drive shaft which is operatively connected to the transmission; determining a target vehicle drive shaft torque in accordance with the sensed accelerator depression; obtaining a vehicle drive shaft torque norm by one of: (i) using throttle position value and output characteristic of a control target including vehicle drive train model, and storing the same in memory for a predetermined period, or (ii) deriving it by reading out a target vehicle drive shaft torque which was recorded a predetermined before and using the prior recorded target vehicle drive shaft torque with the selected norm model; determining the deviation between the output of the vehicle drive shaft torque sensing means and the vehicle drive shaft torque norm; correcting a target vehicle drive shaft torque value based on the deviation between the output of the vehicle drive shaft torque sensing means and the vehicle drive shaft torque norm; and model matching based on the corrected target vehicle drive shaft torque value, the gear ratio which the transmission is conditioned to produce and the rotational speed of the torque converter output shaft and determining the engine control amount which is required to bring the amount of torque which is being transmitted by the vehicle drive shaft and a target torque value which is derived using a norm model which is selected on the basis of predetermined vehicular operational parameters, into agreement.

Another aspect of the invention provides a method of operating the engine of a vehicle having a transmission which is operatively connected to the engine by way of a torque converter, the method featuring the steps of: sensing accelerator pedal depression; sensing the rotational speed of an output shaft of the torque converter which operatively connects the engine to the transmission; sensing the gear ratio which the transmission is conditioned to produce; sensing the torque being transmitted by a vehicle drive shaft which is operatively connected to the transmission; determining a target vehicle drive shaft torque in accordance with the sensed accelerator depression; obtaining a vehicle drive shaft torque norm by one of: (i) using throttle position value and output characteristic of a control target including vehicle drive train model, and storing the same in memory for a predetermined period, or (ii) deriving it by reading out a target vehicle drive shaft torque which was recorded a predetermined before and using the prior recorded target vehicle drive shaft torque with the selected norm model; determining the deviation between the output of the vehicle drive shaft torque sensing means and the vehicle drive shaft torque norm; correcting a target vehicle drive shaft torque value based on the deviation between the output of the vehicle drive shaft torque sensing means and the vehicle drive shaft torque norm; and model matching based on the corrected target vehicle drive shaft torque value, the gear ratio which the transmission is conditioned to produce and the rotational speed of the torque converter output shaft and determining the engine control amount which is required to bring the amount of torque which is being transmitted by the vehicle drive shaft and a target torque value which is derived using a norm model which is selected on the basis of predetermined vehicular operational parameters, into agreement.

Yet another aspect of the invention provides a vehicle including an engine, a transmission which is operatively connected to the engine by way of a torque converter, and a vehicle drive shaft which is operatively connected with the transmission, the arrangement featuring: means for determining the magnitude of a demand for power output; means for determining engine speed; means for determining torque converter output shaft rotational speed; means for determining the gear ratio the transmission is conditioned to produce; means for determining the amount of torque being transmitted by the vehicle drive shaft; means for determining the rotational speed of the vehicle drive shaft; means for determining the steering angle of a steerable road wheel; means for determining a target vehicle drive shaft torque based on the magnitude for power output, the rotational speed of the vehicle drive shaft and the steering angle; means for selecting a norm model from memory based on the sensed vehicle drive shaft torque; means for reading a previously derived a vehicle shaft torque norm out of memory; means for comparing the previously derived a vehicle shaft torque norm with the sensed vehicle drive shaft torque and determining the difference; means for correcting the sensed vehicle drive shaft torque using the determined difference; means for determining a target engine speed based on the rotational speed of the torque converter output shaft, target drive shaft torque and the gear ratio which the transmission is sensed as producing; means for determining a target engine output shaft torque based on the target engine speed and rotational speed of the torque converter output shaft and determining engine control commands which will tend to bring the engine torque to the target engine torque level; and means for determining a drive shaft torque norm based on throttle position value, the throttle position being used to derive the vehicle drive shaft torque norm by using the output characteristic of a control target including vehicle drive train model.

Yet another aspect of the invention provides a method of operating the engine of a vehicle having a transmission which is operatively connected to the engine by way of a torque converter, and a vehicle drive shaft which is operatively connected with the transmission, the method featuring the steps of: determining the magnitude of a demand for power output; determining engine speed; determining torque converter output shaft rotational speed; determining the gear ratio the transmission is conditioned to produce; determining the amount of torque being transmitted by the vehicle drive shaft; determining the rotational speed of the vehicle drive shaft; determining a target vehicle drive shaft torque based on the magnitude for power output, the rotational speed of the vehicle drive shaft and the steering angle; setting the instant target vehicle drive shaft torque in memory; selecting a norm model from memory based on the sensed vehicle drive shaft torque; deriving a drive shaft torque norm by reading out a target vehicle drive shaft torque which was recorded a predetermined period prior the recording of the instant target vehicle drive shaft torque and using the prior recorded target vehicle drive shaft torque with the selected norm model; comparing the previously derived a vehicle shaft torque norm with the sensed vehicle drive shaft torque and determining the difference; correcting the sensed vehicle drive shaft torque using the determined difference; determining a target engine speed based on the rotational speed of the torque converter output shaft, target drive shaft torque and the gear ratio which the transmission is sensed as producing; and determining a target engine output shaft torque based on the target engine speed and rotational speed of the torque converter output shaft and determining engine control commands which will tend to bring the engine torque to the target engine torque level.

A further aspect of the invention provides a vehicle having an engine, a transmission which is operatively connected to the engine by way of a torque converter, and a vehicle drive shaft which is operatively connected with the transmission, the arrangement featuring: means for determining the magnitude of a demand for power output; means for determining engine speed; means for determining torque converter output shaft rotational speed; means for determining the gear ratio the transmission is conditioned to produce; means for determining the amount of torque being transmitted by the vehicle drive shaft; means for determining the rotational speed of the vehicle drive shaft; means for determining a target vehicle drive shaft torque based on the magnitude for power output, the rotational speed of the vehicle drive shaft and the steering angle; means for selecting a norm model from memory based on the sensed vehicle drive shaft torque; means for reading a previously derived a vehicle shaft torque norm out of memory; means for comparing the previously derived a vehicle shaft torque norm with the sensed vehicle drive shaft torque and determining the difference; means for correcting the sensed vehicle drive shaft torque using the determined difference; means for determining a target engine speed based on the rotational speed of the torque converter output shaft, target drive shaft torque and the gear ratio which the transmission is sensed as producing; means for determining a target engine output shaft torque based on the target engine speed and rotational speed of the torque converter output shaft and determining engine control commands which will tend to bring the engine torque to the target engine torque level; and means for determining a drive shaft torque norm based on throttle position value, the throttle position being used to derive the vehicle drive shaft torque norm by using the output characteristic of a control target including vehicle drive train model.

Another aspect of the present invention provides a vehicle having an engine, a transmission which is operatively connected to the engine by way of a torque converter, and a vehicle drive shaft which is operatively connected with the transmission, the arrangement featuring: means for determining the magnitude of a demand for power output; means for determining engine speed; means for determining torque converter output shaft rotational speed; means for determining the gear ratio the transmission is conditioned to produce; means for determining the amount of torque being transmitted by the vehicle drive shaft; means for determining the rotational speed of the vehicle drive shaft; means for determining a target vehicle drive shaft torque based on the magnitude for power output, the rotational speed of the vehicle drive shaft and the steering angle; means for setting the instant target vehicle drive shaft torque in memory; means for selecting a norm model from memory based on the sensed vehicle drive shaft torque; means for deriving a drive shaft torque norm by reading out a target vehicle drive shaft torque which was recorded a predetermined period prior the recording of the instant target vehicle drive shaft torque and using the prior recorded target vehicle drive shaft torque with the selected norm model; means for comparing the previously derived a vehicle shaft torque norm with the sensed vehicle drive shaft torque and determining the difference; means for correcting the sensed vehicle drive shaft torque using the determined difference; means for determining a target engine speed based on the rotational speed of the torque converter output shaft, target drive shaft torque and the gear ratio which the transmission is sensed as producing; and means for determining a target engine output shaft torque based on the target engine speed and rotational speed of the torque converter output shaft and determining engine control commands which will tend to bring the engine torque to the target engine torque level.

BRIEF DESCRIPTION OF THE DRAWINGS

FIG. 3 depicts table data which are used by the control routine according to a first embodiment to determine a target drive shaft torque value;

FIG. 4 depicts tabled norm model data which are also used in the control routine according to a first embodiment to determine a target drive shaft torque value;

FIG. 5 is a graph which depicts data which are used in the first embodiment of the present invention;

FIG. 6 depicts tabled data which is used to derive a target throttle opening value in accordance with the embodiments of the present invention;

FIG. 8 depicts table data which is used by the control routine according to the second embodiment to determine a target drive shaft torque value; and FIG. 9 depicts tabled norm model data which are used by the second embodiment of the present invention.

DETAILED DESCRIPTION OF THE PREFERRED EMBODIMENTS

Figure 1:
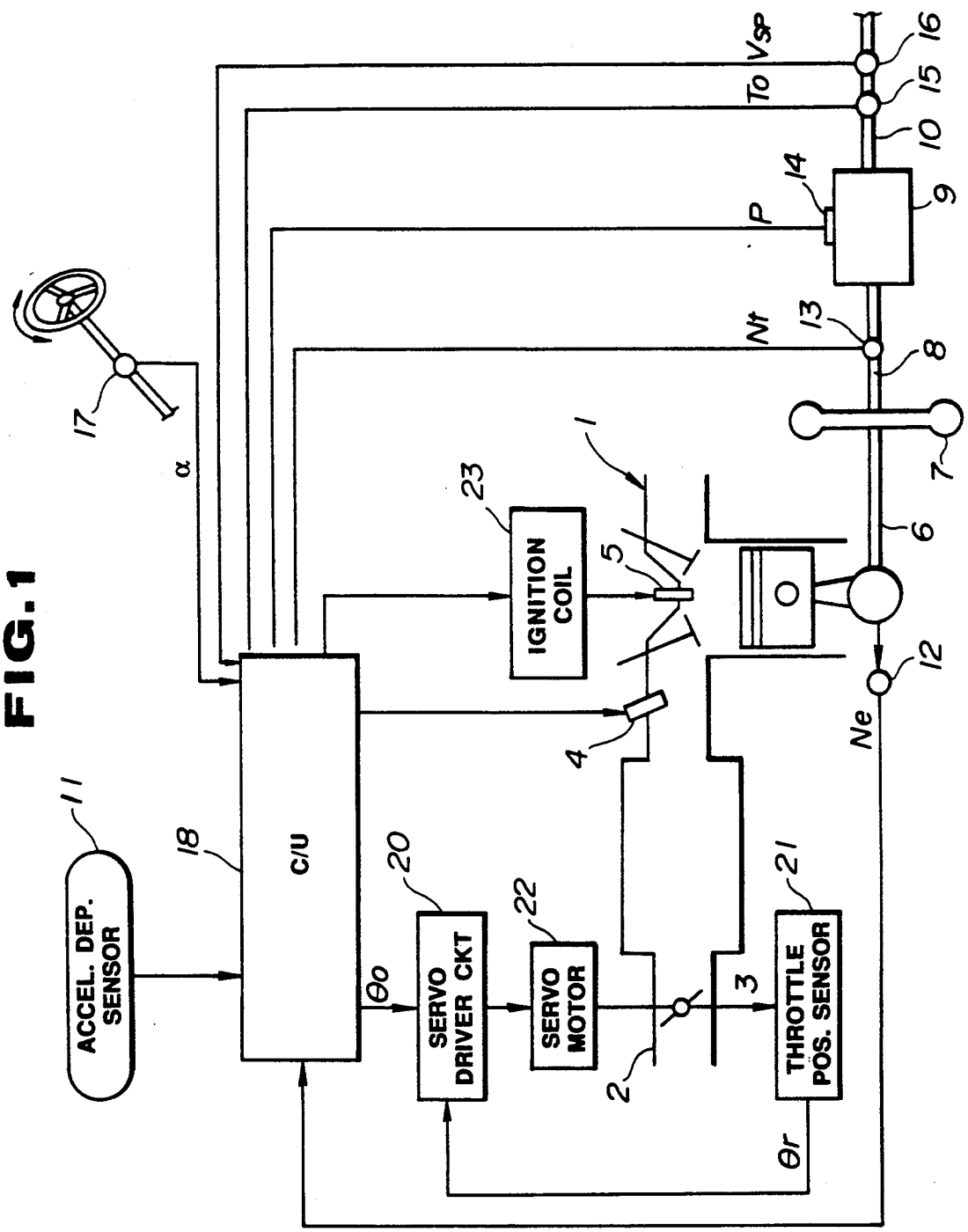
FIG. 1 is a schematic layout of an engine system to which the invention is applied.

FIG. 1 schematically shows a power train and control system to which the present invention is applied. In this arrangement an engine 1 is equipped with an induction conduit 2 in which the a throttle valve 3 is disposed. A fuel injector 4 is disposed in the induction conduit at a location proximate the downstream end thereof and arranged to inject fuel into the air which is flowing toward the combustion chambers of the engine. Each of the combustion chambers is provided with a spark plug 5 which is arranged to selectively ignite the air-fuel mixture which is formed therein.

The energy which is produced during the combustion of the air-fuel mixture is converted into rotation of an engine crank shaft 6. The engine crank shaft 6 is connected to the input shaft of a torque converter 7. Rotational energy is transferred by way of the output shaft of the T/C to the input shaft of a transmission 9. The output shaft of the transmission is operatively connected with a vehicle drive shaft 10.

A potentiometer type accelerator pedal depression degree sensor 11 is provided to sense the position of the accelerator pedal and provide a signal Acc indicative of the same.

An engine rotational speed sensor 12 is arranged to detect the rotational speed of the engine crank shaft and produce a signal Ne indicative of the same. This sensor may take the form of a crank angle sensor which is arranged to produce a train of pulses, the frequency of which can be used to to derive the engine rotational speed Ne.

A torque converter output shaft rotational speed sensor 13 is operatively disposed with the output shaft 8 of the T/C and arranged to produce a signal Nt.

A shift position sensor 14 (e.g. inhibitor switch) is disposed with the transmission 9 and arranged to produce a signal P indicative of the position in which the manually operable shift lever is set in.

A magnetostriction type torque sensor 15 is disposed with the vehicle drive shaft 10 and arranged to produce a signal To indicative of the amount of torque being transmitted therethrough.

A vehicle speed sensor 16 is also disposed with the drive shaft 10 and arranged to produce a signal Vsp indicative of the speed at which the vehicle is moving.

A steering angle sensor 17 is disposed with the vehicle steering in a manner to detect the angular displacement of the steering wheel and to output a signal indicative of the steering angle.

The outputs of the sensors 11-17 are supplied to a control unit 18 which includes a microprocessor. A memory of the microprocessor contains control routines which read in and process the data from the above listed sensors and, as will will described in more detail herein later in connection with the flow chart shown in FIG. 2, derive a target throttle opening position and determine the amount of angular displacement which is required to move the throttle valve from its instant position to the target one. To implement this control, the control unit is operatively connected with the throttle valve by way of a servo driver circuit 20 and a servo motor 22. The servo driver circuit receives an input from a throttle position sensor 21. In this instance the throttle position sensor 21 takes the form of a sliding resistance potentiometer the output of which continuously varies with change in throttle angular position.

It should be noted that the control unit 18 is arranged to receive further data inputs from sensors which provide inputs indicative of, engine coolant temperature, exhaust gas air-fuel ratio, air flow upstream of the throttle chamber in which the throttle valve 3 is disposed, and the like, and which enable the derivation of a suitable control signals which are output to the fuel injector 4 and a ignition coil arrangement 23.

Figure 2:
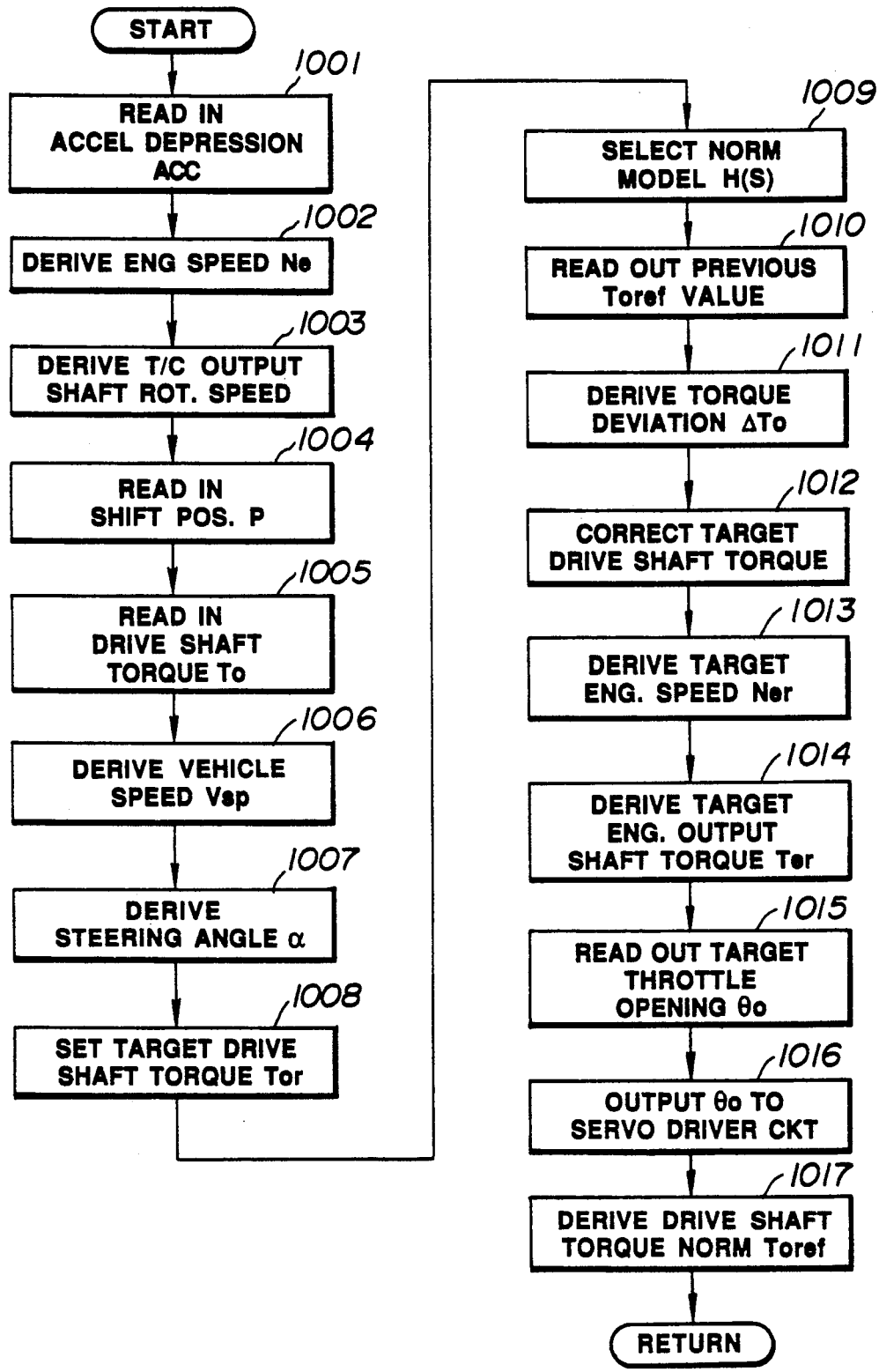
FIG. 2 is flow chart which depicts the steps which characterize the operation of a control routine according to a first embodiment of the invention.

FIG. 2 shows in flow chart form, the steps which are performed by a control routine which characterizes the operation of the present invention. This routine is run a predetermined intervals (e.g. 10 ms). The first steps 1001-1003 are such as to read and/or derive the instant values of Acc, Ne and Nt (viz., the accelerator depression degree, the engine rotational speed and the rotational speed of the T/C output shaft. Following this at step 1004 the output of the inhibitor switch (shift position sensor 14) is read and the result suitably set in memory ready for further processing. At steps 1005-1007 the vehicle drive shaft torque, vehicle speed and steering angle values To, Vsp and are read/derived.

At step 1008 the target vehicle drive shaft torque Tor is set based on the drivers' requirements as indicated by the Acc, Vsp and data obtained in the previous steps.

In order to achieve the above derivation, it is possible in accordance with the present invention to take advantage of mapped data wherein Acc is recorded in terms of Tor and Vsp and wherein the Acc characteristics vary as the steering angle increases. The degree in which the Acc characteristics shift with respect to change in æ is determined based on the maximum power output characteristics of the vehicle and limits which must be exercised in order to maintain stable safe cornering.

Alternatively, it is possible to derive the target vehicle drive shaft torque Tor value using a suitable algorithm based on the following equation.

$$Tor = k1 \cdot (Acc - k2) \cdot (Vsp - k3) \cdot æ$$

wherein k1, k2 and k3 are suitable constants/correction factors.

At step 1009 a suitable "norm" model H(s) is selected from memory based on the vehicle drive shaft torque To. As will be appreciated, these models are recorded in terms of gain and time. For example, as shown in FIG. 3, in the interest of safety, as the steering angle æ increases, the rate at which the gain parameter increases, reduces.

In the instant embodiment, the norm model H(s) is expressed in terms of second order time lag and dead time elements as per the following equation.

$$H(s) = \frac{\exp(-\tau_p S)}{(T_A S + 1)^2} \quad (1)$$

At step 1010 the value of a vehicle shaft torque norm Toref which was determined in the last step of the routine during the previous sampling period, is read out. At step 1011 the instant value of the vehicle drive shaft torque To is compared with the Toref value obtained in the previous step and a torque change or difference ΔTo is derived. Viz., $$\Delta TO = TO - Toref$$

At step 1012 the ΔTo value is used to correct the instant Tor value and produce a new value Tor'. Viz., $$Tor' = Tor - \Delta To$$

At step 1013 a target engine rotational speed value Ner is derived. The first step of this process involves using the corrected torque value Tor' with a value Gr indicative of the gear ratio which is being produced by the transmission in accordance with the instant position of the manually operable shift lever (indicated by signal P) in order to obtain a target T/C output shaft torque value Ttr. Viz., $$Ttr = \frac{Tor'}{Gr} \quad (2)$$

Following this, the Ttr and Nt values are used to derive the target engine rotational speed Ner. Viz., $$Ner = f(Ttr, Nt)$$

As shown in FIG. 4, as the torque converter characteristics are such that the rotational speed of the T/C input shaft (engine rotational speed Ne) and the rotational speed of the T/C output shaft Nt, exhibit a given relationship, the T/C output shaft rotational speed Nt and the torque which appears on the same Tt can be obtained from the following quadratic equation model. (No coupling condition)

$$Tt = A0 \cdot Nt^2 + A1 \cdot Nt \cdot Ne + A2 \cdot Ne^2 \qquad (3)$$

(Coupling condition)

$$Tt = B0 \cdot Nt^2 + B1 \cdot Nt \cdot Ne + B2 \cdot Ne^2 \qquad (4)$$

wherein: A0–A2, B0–B2 denote fixed T/C related constants.

As indicated in FIG. 4 the above two equations the torque capacity $\tau$ (= Tt/Ne2) is depicted in the form of a quadratic curve in terms of the rotational speed ratio Nt/Ne.

Accordingly, $$\frac{Tt}{Ne^2} = C0 \cdot \left(\frac{Nt}{Ne}\right)^2 + C1 \cdot \left(\frac{Nt}{Ne}\right) + C2$$

wherein C0–C2 are constants which can be extracted from the convexity of the above mentioned quadratic curve of FIG. 4.

As will be appreciated, by using the above equation it is possible to obtain Tt.

It will be noted that the efficiency h is expressed as a ratio of Nt.Ner to Ne.Te (wherein Te denotes the input torque).

By substituting the engine rotational speed Ne which will provide the target vehicle drive shaft torque Ttr in equations (3) and (4), it is possible to obtain:

$$Ttr = A0 \cdot Nt^2 + A1 \cdot Nt \cdot Ner + A2 \cdot Ner^2 \qquad (5)$$

$$Ttr = B0 \cdot Nt^2 + B1 \cdot Nt \cdot Ner + B2 \cdot Ner^2 \qquad (6)$$

Under these circumstances with Ttr and Nt as variables it is possible to determine Ner by solving the simultaneous quadratic equations (5) and (6).

It should be noted that it is within the scope of the present invention to table the Ner value in terms of Ttr and Nt in a manner which permits the same to be obtained via table look-up.

At step 1014 the actual engine rotational speed Ne and the target engine rotational speed Ner are used with the response characteristics obtained from the previously selected norm model H(s) in a manner which enables the target engine output torque Ter to be derived.

In the instant embodiment an EXACT model matching compensation is prepared using a reverse system target control model.

In later mentioned steps 1015 and 1016, the target engine output torque Ter is used as a base to derive throttle valve opening control while the engine response characteristics GM(s) (equation 8) are controlled in a manner to follow the target engine output shaft torque value. The EXACT matching compensator C(s) is expressed in equation (7).

$$C(s) = H(s)/GM(s) \qquad (7)$$

$$Ne = GM(s) \cdot Ter \qquad (8)$$

$$Ter = C(s) \cdot Ner \qquad (9)$$

As apparent from equations (8) and (9) the relationship between the target engine rotational speed Ner and the actual engine rotational speed Ne can be expressed by the following equation:

$$Ne = H(s) \cdot Ner \qquad (10)$$

By using a known technique equation (8) is digitized each sampling period Ts and using the following recurrence formula equation (11), the target engine output shaft torque Ter is derived.

$$Ter(k) = K6 \cdot Ter(k-1) + K7 \cdot Ter(k-2) + K8 \cdot Ner(k) + K9 \cdot Ner(k-1) + K10 \cdot Ner(k-2) \qquad (11)$$

At step 1015 the target engine output shaft torque Ter which is obtained in step 1014 and the engine rotational speed Ne are used with tabled target throttle position data of the nature depicted in FIG. 6 to obtain a target throttle position value $\phi o$. As will be appreciated, the data depicted in FIG. 8 will vary from engine to engine (viz., will vary with displacement, compression ratio us of supercharging/naturally aspiration etc.) and will have to be developed for the type of engine which is being used.

At step 1016 the target throttle position $\phi o$ value is output to the servo driver circuit 20 which subsequently feedback controls the servo motor 22 to move position of the throttle valve 3 from the instant position toward the target one.

At step 1017 the target throttle position value $\phi o$ which was obtained in step 1015 is used as an input to derive the above mentioned vehicle drive shaft torque norm Toref by using the output characteristic of a control target including vehicle drive train model. Viz., $$Toref = f(\phi o)$$

wherein the engine steady state characteristics (FIG. 6), the engine transition characteristics (equation (8)), torque characteristics (equations (3) and (4)) the transmission characteristics (equation (2)) are used as they are.

Accordingly, as apparent from equations (10) etc., the relationship between the target vehicle drive shaft torque correction value Tor' and the vehicle drive shaft norm Toref is given by the norm model H(s) expressed as follows:

$$Toref = H(s) \cdot Tor' \qquad (12)$$

It should be noted that it is possible to obtain the same effect even if the vehicle drive shaft torque norm Toref is derived using the target engine output shaft torque Ter as an input in the control target or objective including vehicle drive train model characteristic output.

OPERATION

It will be appreciated that it is not possible with the known control techniques to use the accelerator pedal depression (displacement) to exactly derive the vehicle drive shaft torque response characteristics. Further, the drive train torque response characteristics of the engine and torque converter characteristics are such that the characteristics which are obtained when the vehicle is running in a straight line are different from those which occur when the vehicle is cornering or traversing a curved path. Accordingly, it is left to the driver's discretion as to exactly how much the accelerator pedal should be depressed under the instant vehicle operating conditions.

In view of this, the target vehicle drive shaft torque (steady state characteristics), the accelerator pedal displacement Acc, the vehicle speed Vsp and the vehicle steering angle æ data is collected and a norm model (transitory characteristics) is determined, in a manner which enables control of the throttle valve position.

This enables the vehicle drive shaft torque response characteristics to be precisely determined in view of driver's requirements (accelerator pedal displacement) and to alleviate the drivers' control burden in achieving stable safe operation during both cornering and straight ahead running.

However, only when a difference $\Delta$To occurs between the actual drive train response characteristics and the those of the drive train model (equations (2), (3), (4), (8) and FIG. 6), is feedback control carried out. Therefore, if the drive train model is accurate, it becomes possible to advantageously feed forward (instantaneous) and feedback (steady deviation free). That is to say, with the present invention, based on the norm model of the vehicle drive shaft torque it is possible to achieve steady deviation free control.

SECOND EMBODIMENT

Figure 7:
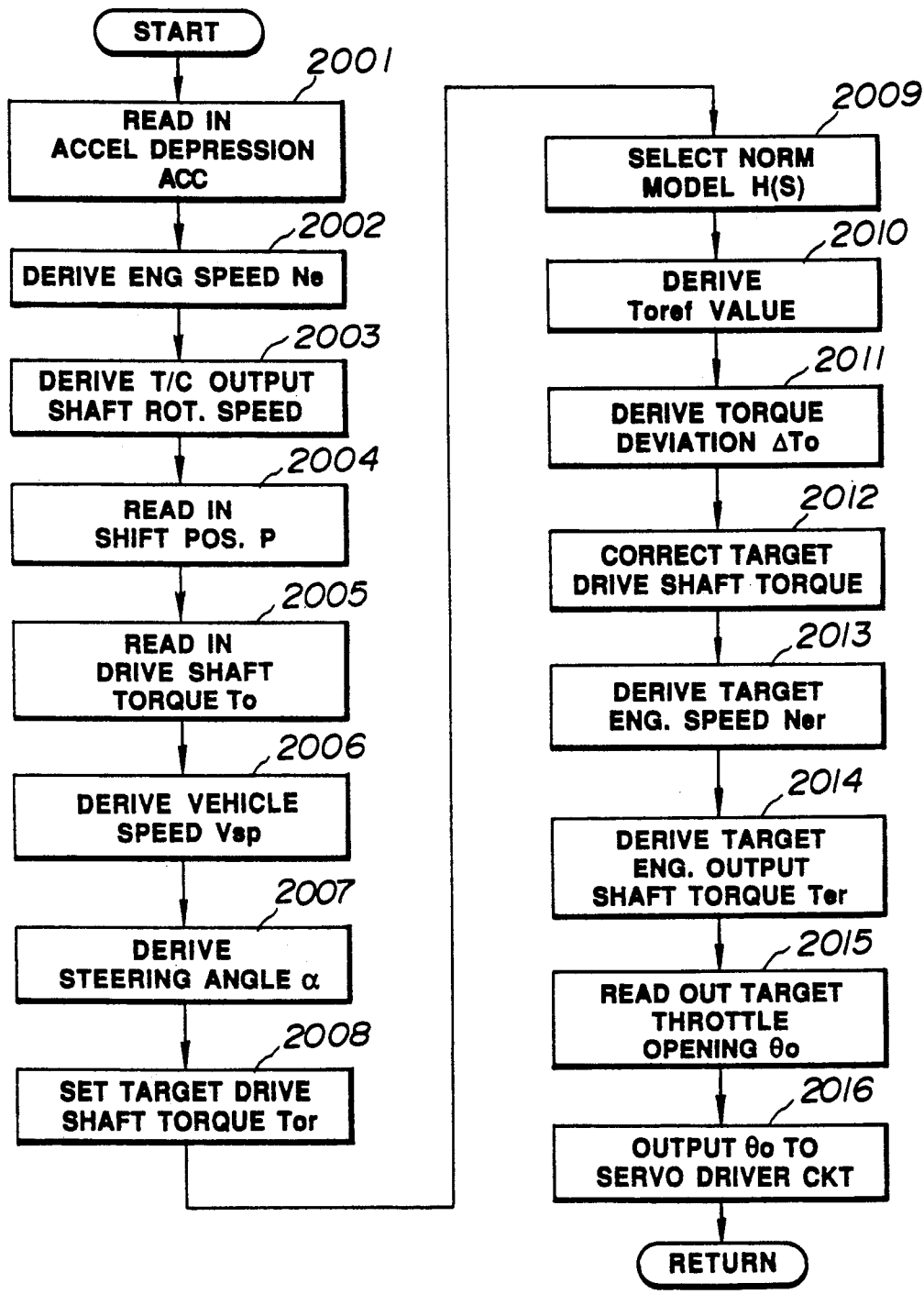
FIG. 7 is a flow chart which depicts the steps which characterize the operation of a control routine according to a second embodiment of the invention.

FIG. 7 shows a control routine which characterizes a second embodiment of the present invention. This routine is run at predetermined intervals (e.g. 10 ms)

Steps 2001-2009 are the same as those performed in steps 1001-1009 of the first embodiment.

At step 2010 the Tor' value which was obtained step 2012 during the last sampling period Ts (Ts=10 ms) is read out of memory and used to derive the Toref value based on the norm model which was selected in step 2009.

In this instance a known technique is used to derive a Toref value by digitizing the value obtained by the following recurrence formula.

$Toref(k) = y(k - tp/Ts)$ $y(k) = K1.y(k-1) + K2.y(k-2) + K3.Tor'(k) + K4.Tor'(k-1) + K5.Tor'(k-2)$ In step 2011 the value of $\Delta$To is derived by determining the difference between the sensed vehicle drive shaft torque To and the Toref value obtained in step 2010.

Steps 2012-2016 are the same as steps 1012-1016 of the previous embodiment.

In order to improve the control which is provided by the present invention it is possible to determine the following parameters.

1. Rainfall

Using a suitable rain drop sensor it is possible to estimate the amount of rain R which is falling and to modify the selection of the H(s) map via which the Toref value is derived. As shown in FIG. 8, a plurality of Tor tables are provided which enables the driver's requirements as indicated by the accelerator pedal depression degree Acc the vehicle operating conditions (vehicle speed Vsp, rain fall R) to be appropriately selected. As will be appreciated, as the value of R increases the friction coefficient of the road surface $\mu$ decreases and the chances of wheel slip increase. Accordingly, the Tor values decrease.

It should be noted that as an alternative to tabled data it is possible to use the following type of calculation:

$Tor = K1.Acc - k2.Vsp - k3.R$

Further, in accordance with the driving condition (R) the selection of the norm model H(s) from which the vehicle drive shaft torque characteristics are derived is modified. In order to improve driving safety as R increases the model moves to the right as indicated in FIG. 9.

2. Vehicle loading

Depending on the stroke of the suspension (as sensed by suspension sensors(s)) the number of passengers and/or the amount of baggage etc., which is on board W can be determined and depending on the magnitude of this parameter, the target vehicle drive shaft torque value Tor is modified.

In this case also that driver' requirement as sensed by the amount of accelerator pedal displacement Acc taken with other driving related parameters such as vehicle speed Vsp and W are used as a base for, as shown in FIG. 8, selecting an appropriate map. From the point of vehicle acceleration, as the magnitude of W increases a greater amount of torque is required. Accordingly, the maps are arranged so that as W increases the map selection moves in a direction which tends to increase the amount of torque which is supplied to the driving wheels of the vehicle.

As an alternative to using mapped data a suitable algorithm may be used to derive the Tor value in the following manner.

$Tor = K1.Acc - k2.Vsp + k3.W$

3. Road inclination

By sampling the output of an accelerometer while the vehicle is running at constant speed it is possible to determine the inclination $\phi$s of the road.

Like the above R and W parameters it is possible to effect the Tor determination and/or the norm model H(s) selection.

As indicated in FIG. 8 when and as the value of $\phi$s increases ($\phi$s>0) the table selection moves in a direction which tends to increase the value of Tor in order to assist in driving the vehicle up the incline. On the other hand, when $\phi$s<0 the map selection tends to move in a direction which reduces Tor.

As an alternative to table look-up it possible to derive the Tor value using the following equation.

$Tor = K1.Acc - k2.Vsp + k3.\phi s$

Further, in accordance with the driving condition ($\phi$s) the selection of the norm model H(s) from which the vehicle drive shaft torque characteristics are derived is modified. From a vehicle safety aspect, the selection moves in the direction indicated in FIG. 9.

4. Drive wheel load

By using a suspension sensor(s) it is possible to determine the load on the driving wheels N.

When the value of N reduces, the force which can be transmitted through that wheel to the road surface tends to reduce and the chances of slip increase. In view of this it is deemed advantageous to reduce the Tor value with decrease in N (FIG. 8).

Alternatively, it is possible to derive the value of Tor using the following equation:

$Tor = K1.Acc - k2.Vsp + k3.N$

Further, in accordance with the driving condition (N) the selection of the norm model H(s) from which the vehicle drive shaft torque characteristics are derived is modified. In order to reduce slip, the selection moves in the direction indicated in FIG. 9.

In the event that the vehicle is equipped with a variable spoiler via which the downforce can be varied, it is possible to table data pertaining to the position in which an actuator associated with the variable spoiler is set with respect to vehicle speed and to modify the N value via table look-up.

The various other parameters which can be used with and/or in place of the above mentioned R, W, $\phi$s and N are deemed to be obvious to those skilled in the art of vehicle control.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. In a vehicle having an engine and a transmission which is operatively connected to the engine by way of a torque converter, an engine control system comprising:

means for sensing accelerator pedal depression;
   means for sensing torque converter output shaft rotational speed;
   means for sensing transmission gear ratio;
   means for sensing vehicle drive shaft torque;
   means responsive to the accelerator depression sensing means for determining a target vehicle drive shaft torque;
   means responsive to an engine control amount and a predetermined control schedule which represents the operation of the engine and the transmission, for determining an expected vehicle drive shaft torque;
   means for determining a difference between the vehicle drive shaft torque and the expected vehicle drive shaft torque;
   means for correcting the target vehicle drive shaft torque based on the difference between the vehicle drive shaft torque and the expected vehicle drive shaft torque and producing a corrected target drive shaft torque value; and
   means which is responsive to the corrected target vehicle drive shaft torque value, the transmission gear ratio and the torque converter output shaft rotational speed, for selecting pre-memorized data from a memory on the basis of predetermined vehicular operating parameters, and using the pre-memorized data to determine the engine control amount which is required to bring the vehicle drive shaft torque and the target vehicle drive shaft torque value, into agreement.

2. In a vehicle having an engine and a transmission which is operatively connected to the engine by way of a torque converter, an engine control system comprising:

means for sensing accelerator pedal depression;
   means for sensing torque converter output shaft rotational speed;
   means for sensing transmission gear ratio;
   means for sensing vehicle drive shaft torque;
   means responsive to the accelerator depression sensing means for determining a target vehicle drive shaft torque;
   means for deriving an expected vehicle drive shaft torque based on a corrected target vehicle drive shaft torque and a delay which is determined using predetermined control data selected on the basis of predetermined vehicular operating parameters;
   means for determining the differences between the vehicle drive shaft torque and the expected vehicle drive shaft torque;
   means for correcting the target vehicle drive shaft torque value based on the difference between the vehicle drive shaft torque and the expected vehicle drive shaft torque and producing the corrected target vehicle drive shaft torque;
   matching means responsive to the corrected target vehicle drive shaft torque, the transmission gear ratio, and the torque converter output shaft rotational speed, for using the predetermined control data to determine an engine control amount which is required to bring the vehicle drive shaft torque and the target drive shaft torque value, into agreement.

3. An engine control system as claimed in claim 2, wherein:

said matching means comprises
   target engine rotational speed determining means which uses the corrected target vehicle drive shaft torque, the transmission gear ratio and the torque converter output shaft rotational speed, to develop a target engine rotational speed value which will bring the actual drive vehicle shaft torque into agreement with the target vehicle drive shaft torque; and
   engine rotational speed matching control means for controlling the engine rotational speed, said engine rotational speed matching control means using the actual engine rotational speed and the target engine rotational speed to change the actual engine rotational speed toward the target engine rotational speed level.

4. An engine control system as claimed in claim 3, wherein:

the engine rotational speed matching control means comprises
   means for deriving a target engine output shaft torque value based on the actual engine rotational speed, the target engine rotational speed and the predetermined control data; and
   air induction control means for controlling the amount or air which is inducted into the engine based on the target engine output torque.

5. An engine control system as claimed in claim 1, wherein:

the target vehicle drive shaft torque derivation means comprises
   means for receiving a signal indicative of the vehicle operating conditions; and
   means for deriving the target vehicle output shaft torque based on the signal indicative of the vehicle operating conditions and the amount of accelerator pedal depression.

6. An engine control system as claimed in claim 2 wherein:

the target vehicle drive shaft torque derivation means comprises means for receiving a signal indicative of the vehicle operating conditions; and means for deriving the target vehicle output shaft torque based on the signal indicative of the vehicle operating conditions and the amount of accelerator pedal depression.

7. In a vehicle having an engine and a transmission which is operatively connected to the engine by way of a torque converter, a method of operating an internal combustion engine comprising the steps of:

sensing accelerator pedal depression;

sensing torque converter output shaft rotational speed;

sensing transmission gear ratio;

sensing vehicle drive shaft torque;

determining a target vehicle drive shaft torque in accordance with the sensed accelerator depression;

obtaining an expected vehicle drive shaft torque by one of:

(i) using throttle position value and predetermined control data which models the engine and transmission and which includes a control target, and storing the result in memory for a predetermined period, or (ii) reading out a target vehicle drive shaft torque which was recorded a predetermined before the using the prior recorded target vehicle drive shaft torque with selected tabled data;

determining the deviation between the vehicle drive shaft torque and the expected vehicle drive shaft torque;

correcting the target vehicle drive shaft torque based on the deviation between the vehicle drive shaft torque and the expected vehicle drive shaft torque; and using the corrected target vehicle drive shaft torque value, the transmission gear ratio, the torque converter output shaft rotational speed and predetermined control data which models the engine and transmission and which is selected on the basis of predetermined vehicular operational parameters to determine the engine control amount which is required to bring the amount of torque which is being transmitted by the vehicle drive shaft and the target torque value into agreement.

8. In a vehicle having an engine, a transmission which is operatively connected to the engine by way of a torque converter, and a vehicle drive shaft which is operatively connected with the transmission, said engine having a throttle valve and means for determining the position of the throttle valve:

means for determining a demand for power output;

means for determining engine speed;

means for determining torque converter output shaft rotational speed;

means for determining transmission gear ratio;

means for determining vehicle drive shaft torque;

means for determining vehicle drive shaft rotational speed;

means for determining the steering angle of a steerable vehicle road wheel;

means for determining a target vehicle drive shaft torque based on the magnitude for power output, the rotational speed of the vehicle drive shaft and the steering angle;

means for selecting predetermined tabled data from a memory based on the sensed vehicle drive shaft torque;

means for reading a previously derived expected vehicle shaft torque out of memory;

means for comparing hte previously derived expected vehicle shaft torque with the sensed vehicle drive shaft torque and determining the difference;

means for correcting the target vehicle drive shaft torque using the determined difference;

means for determining a target engine speed based on the torque converter rotational speed, corrected target drive shaft torque and the transmission gear ratio;

means for determining a target engine output shaft torque based on the target engine speed and torque converter output shaft rotational speed and determining engine control commands which will tend to bring the engine torque to the target engine torque level; and means for determining an expected drive shaft torque based on engine throttle position, the engine throttle position being used to derive the expected vehicle drive shaft torque by using the output characteristic of predetermined control data which models the engine and the transmission and which includes a predetermined control target.

9. In a vehicle having an engine, a transmission which is operatively connected to the engine by way of a torque converter, and a vehicle drive shaft which is operatively connected with the transmission, a method of operating an internal combustion engine comprising the steps of:

determining a vehicle steering angle;

determining a demand for power output;

determining engine speed;

determining torque converter output shaft rotational speed;

determining the transmission gear ratio;

determining a vehicle drive shaft torque;

determining the vehicle drive shaft rotational speed;

determining a target vehicle drive shaft torque based on the power output demand, the drive shaft rotational speed and the steering angle;

setting the instant target vehicle drive shaft torque in memory;

selecting predetermined tabled data from a memory based on the sensed vehicle drive shaft torque;

deriving an expected drive shaft torque by reading out a target vehicle drive shaft torque which was recorded a predetermined period prior the recording of the instant target vehicle drive shaft torque and using the prior recorded target vehicle drive shaft torque with the selected tabled data;

comparing the previously derived expected vehicle shaft torque norm with the sensed vehicle drive shaft torque and determining the difference;

correcting the target vehicle derive shaft torque using the determined difference;

determining a target engine speed based on the torque converter output shaft rotational speed , corrected target drive shaft torque and the transmission gear ratio; and determining a target engine output shaft torque based on the target engine speed and the torque converter output shaft rotational speed and determining engine control commands which will tend to bring the engine torque to the target engine torque level.

10. In a vehicle having an engine, a transmission which is operatively connected to the engine by way of a torque converter, and a vehicle drive shaft which is operatively connected with the transmission:

- means for sensing a vehicle operational parameter;
- means for determining a demand for power output;
- means for determining engine speed;
- means for determining torque converter output shaft rotational speed;
- means for determining the transmission gear ratio;
- means for determining torque transmitted by the vehicle drive shaft;
- means for determining vehicle drive shaft rotational speed;
- means for determining a target vehicle drive shaft torque based on the power output demand, the rotational speed of the vehicle drive shaft and the vehicle operational parameter;
- means for selecting one of a plurality of predetermined tabled data from a memory based on the vehicle drive shaft torque;
- means for reading a previously derived expected vehicle shaft torque out of memory;
- means for comparing the previously derived expected vehicle shaft torque with the sensed vehicle drive shaft torque and determining the difference;
- means for correcting the vehicle drive shaft torque using the determined difference;
- means for determining a target engine speed based on the rotational speed of the torque converter output shaft, target drive shaft torque and the transmission gear ratio;
- means for determining a target engine output shaft torque based on the target engine speed and rotational speed of the torque converter output shaft and determining engine control commands which will tend to bring the engine torque to the target engine torque level; and
- means for determining an expected drive shaft torque based on an engine load indicative value and setting the expected drive shaft torque in memory, the engine load indicative value being used in combination with predetermined drive train model simulating data which includes a control target.

11. In a vehicle having an engine, a transmission which is operatively connected to the engine by way of a torque converter, and a vehicle drive shaft which is operatively connected with the transmission:

- means for sensing a vehicle steering angle;
- means for determining a power output demand;
- means for determining engine speed;
- means for determining torque converter output shaft rotational speed;
- means for determining transmission gear ratio;
- means for sensing vehicle drive shaft torque;
- means for determining vehicle drive shaft rotational speed;
- means for determining a target vehicle drive shaft torque based on the power output demand, the vehicle drive shaft rotational speed and the steering angle;
- means for recording the instant target vehicle drive shaft torque in a memory;
- means for selecting a control schedule from memory based on the sensed vehicle drive shaft torque;
- means for deriving an expected drive shaft torque by reading out a target vehicle drive shaft torque which was recorded a predetermined period prior the recording of the instant target vehicle drive shaft torque and using the prior recorded target vehicle drive shaft torque with the selected control schedule;
- means for comparing the expected vehicle shaft torque with the sensed vehicle drive shaft torque and determining the difference;
- means for correcting the sensed vehicle drive shaft torque using the determined difference and producing a corrected vehicle drive shaft torque value;
- means for determining a target engine speed based on the rotational speed of the torque converter output shaft, corrected target drive shaft torque value and the transmission gear ratio;
- means for determining a target engine torque based on the target engine speed and the rotational speed of the torque converter output shaft; and
- means for determining engine control commands which will bring the engine torque to the target engine torque level.

12. In a vehicle having an engine and a transmission which is operatively connected to the engine by way of a torque converter, an engine control system comprising:

- means for sensing accelerator pedal depression;
- means for sensing torque converter output shaft rotational speed;
- means for sensing transmission gear ratio;
- means for sensing vehicle drive shaft torque;
- means for determining a target vehicle drive shaft torque in accordance with the sensed accelerator depression;
- means for obtaining an expected vehicle drive shaft torque by one of:
  (i) using throttle position value and predetermined control data which models the engine and transmission and which includes a control target, and storing the result in memory for a predetermined period, or
  (ii) reading out a target vehicle drive shaft torque which was recorded a predetermined before and using the prior recorded target vehicle drive shaft torque with selected tabled data;
- means for determining the deviation between the vehicle drive shaft torque and the expected vehicle drive shaft torque;
- means for correcting the target vehicle drive shaft torque based on the deviation between the vehicle drive shaft torque and the expected vehicle drive shaft torque; and
- means for using the corrected target vehicle drive shaft torque value the transmission gear ratio, the torque converter output shaft rotational speed and predetermined control data the basis of predetermined vehicular operational parameters, to determine the engine control amount required to bring the vehicle drive shaft and the target torque value into agreement.

* * * * *